(12) United States Patent
Jo et al.

(10) Patent No.: US 12,175,299 B2
(45) Date of Patent: Dec. 24, 2024

(54) COMPUTING DEVICE AND METHOD FOR ALLOCATING RESOURCES USING COST MATRIX

(71) Applicant: SAMSUNG ELECTRONICS CO., LTD, Suwon-si (KR)

(72) Inventors: Jae-Eon Jo, Suwon-si (KR); Hyung-Dal Kwon, Hwaseong-si (KR); Hanmin Park, Hwaseong-si (KR); Jaehyeong Sim, Hwaseong-si (KR); Seung Wook Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 556 days.

(21) Appl. No.: 17/223,139

(22) Filed: Apr. 6, 2021

(65) Prior Publication Data
US 2022/0083390 A1 Mar. 17, 2022

(30) Foreign Application Priority Data

Sep. 11, 2020 (KR) .................. 10-2020-0117000

(51) Int. Cl.
G06F 9/50 (2006.01)
G06F 1/3237 (2019.01)
(Continued)

(52) U.S. Cl.
CPC .......... *G06F 9/5055* (2013.01); *G06F 1/3237* (2013.01); *G06F 9/4881* (2013.01);
(Continued)

(58) Field of Classification Search
CPC .... G06F 9/5055; G06F 1/3237; G06F 9/4881; G06F 9/5016; G06F 1/3234;
(Continued)

(56) References Cited

U.S. PATENT DOCUMENTS 8,619,800 B1 * 12/2013 Finney .................. G06F 9/3885
370/413
8,776,030 B2 7/2014 Grover et al.
(Continued)

FOREIGN PATENT DOCUMENTS

CN 109936604 A 6/2019
CN 111078398 A 4/2020
(Continued)

OTHER PUBLICATIONS

Yokoya Yuji, JPH09-097243A Translation, Apr. 1997, <URL:https://www.j-platpat.inpit.go.jp/c1800/PU/JP-H09-097243/91280F4DFF0372C955B2FB539797EC9B41B4EF0DCF01EEFB5C2B2FAFEDE5C1E6/11/en>, pp. 1-36 (Year: 1997).*
(Continued)

*Primary Examiner* — Meng Ai T An
*Assistant Examiner* — Hsing Chun Lin
(74) *Attorney, Agent, or Firm* — NSIP Law

(57) ABSTRACT

A computing device and method is disclosed. The computing device includes a plurality of processing cores, and a tile scheduler configured to update a cost matrix of each of the plurality of processing cores based on meta information of each of first tiles previously allocated to the plurality of processing cores and meta information of each of second tiles, and allocate the second tiles with respect to the plurality of processing cores using the updated cost matrix of each of the plurality of processing cores.

30 Claims, 11 Drawing Sheets

(51) Int. Cl.
*G06F 9/48* (2006.01)
*G06N 3/045* (2023.01)
*G06N 3/063* (2023.01)

(52) U.S. Cl.
CPC .......... *G06F 9/5016* (2013.01); *G06N 3/045* (2023.01); *G06N 3/063* (2013.01)

(58) Field of Classification Search
CPC ............. G06F 2209/508; G06F 9/5066; G06F 9/5027; G06F 9/3836; G06F 9/5077; G06F 9/5033; G06N 3/045; G06N 3/063; G06N 3/04; Y02D 10/00
See application file for complete search history.

(56) References Cited

U.S. PATENT DOCUMENTS

| | | | |
|---|---|---|---|
| 9,632,834 B2 | 4/2017 | Kini et al. | |
| 10,942,767 B2* | 3/2021 | Chandra | G06N 3/02 |
| 2011/0261698 A1* | 10/2011 | Kamerkar | H04L 43/0888 370/252 |
| 2016/0379115 A1 | 12/2016 | Burger et al. | |
| 2017/0344882 A1* | 11/2017 | Ambrose | G06N 3/045 |
| 2018/0253635 A1* | 9/2018 | Park | G06N 3/02 |
| 2019/0138922 A1 | 5/2019 | Liu et al. | |
| 2019/0147337 A1 | 5/2019 | Yang | |
| 2019/0171926 A1 | 6/2019 | Chen et al. | |
| 2019/0171930 A1 | 6/2019 | Lee et al. | |
| 2019/0180177 A1 | 6/2019 | Yim et al. | |
| 2019/0187963 A1* | 6/2019 | Bokhari | G06F 8/35 |
| 2019/0188572 A1 | 6/2019 | Lanctot et al. | |
| 2019/0197001 A1 | 6/2019 | Han et al. | |
| 2019/0205755 A1 | 7/2019 | Sekiyama et al. | |
| 2019/0243755 A1 | 8/2019 | Luo et al. | |
| 2019/0266504 A1 | 8/2019 | Apparao et al. | |
| 2020/0012929 A1 | 1/2020 | Penner et al. | |
| 2020/0019836 A1 | 1/2020 | Arthur et al. | |
| 2020/0301739 A1* | 9/2020 | Xu | G06N 3/063 |
| 2021/0201124 A1* | 7/2021 | Gelashvili | G06N 3/045 |
| 2022/0319161 A1* | 10/2022 | Cao | G06F 8/41 |

FOREIGN PATENT DOCUMENTS

| | | | |
|---|---|---|---|
| GB | 2558394 A | | 7/2018 |
| JP | H09-097243 A | * | 4/1997 |
| JP | 6582592 B2 | | 10/2019 |
| JP | 6631740 B1 | | 1/2020 |
| KR | 10-1710910 B1 | | 3/2017 |
| WO | WO 2019/160196 A1 | | 8/2019 |

OTHER PUBLICATIONS

Han et al. EIE: Efficient Inference Engine on Compressed Deep Neural Network, May 2016, <URL:https://arxiv.org/pdf/1602.01528.pdf>, pp. 1-12 (Year: 2016).*

Ghodsi, Ali, et al. "Dominant Resource Fairness: Fair Allocation of Multiple Resource Types." *Nsdi*. vol. 11. No. 2011. (14 pages in English).

Choi, Yujeong, et al. "Prema: A predictive multi-task scheduling algorithm for preemptible neural processing units." Feb. 22-26, 2020, *IEEE International Symposium on High Performance Computer Architecture* (*HPCA*). (15 pages in English).

Extended European Search Report issued on Jun. 7, 2022 in counterpart European Patent Application No. 21189774.9 (11 pages in English).

Bartz, Dirk, et al. "Rendering and Visualization in Parallel Environments." *IEEE Visualization 2001 tutorial 3*. (2001). pp 1-51.

* cited by examiner $S_{A111\text{-}B111}$ = Size of P11 + Size of O11

$S_{A001\text{-}B010}$ = Size of P01

|   | ⋯ | ⋯ | B010 | ⋯ | B111 | ⋯ |
|---|---|---|---|---|---|---|
| ⋯ |   |   |   |   |   |   |
| A001 |   |   | $S_{A001\text{-}B010}$ | ⋯ | ⋯ | ⋯ |
| ⋯ |   |   |   | ⋯ | ⋯ | ⋯ |
| A111 |   |   |   |   | $S_{A111\text{-}B111}$ | ⋯ |
| ⋯ |   |   |   |   |   | ⋯ |
| ⋯ |   |   |   |   |   |   |

Cost matrix of core 2

FIG. 7

COMPUTING DEVICE AND METHOD FOR ALLOCATING RESOURCES USING COST MATRIX

CROSS-REFERENCE TO RELATED APPLICATIONS

This application claims the benefit under 35 USC § 119(a) of Korean Patent Application No. 10-2020-0117000 filed on Sep. 11, 2020, in the Korean Intellectual Property Office, the entire disclosure of which is incorporated herein by reference for all purposes.

BACKGROUND

1. Field

The following description relates to a computing device and method.

2. Description of Related Art

As artificial intelligence (AI) technology progresses, specialized AI hardware may be used to perform learning and trained inference. As hardware dedicated to the implementation of AI, a neural processor may be used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a computing device includes a plurality of processing cores, and a tile scheduler configured to update a cost matrix of each of the plurality of processing cores based on meta information of each of first tiles previously allocated to the plurality of processing cores and meta information of each of second tiles, and allocate the second tiles with respect to the plurality of processing cores using the updated cost matrix of each of the plurality of processing cores.

For the updating of the cost matrix, the tile scheduler may be configured to calculate, for each of the plurality of processing cores, a received data quantity for each of plural pairings among the first and second tiles based on the meta information of each of the first tiles and the meta information of each of the second tiles, and update the cost matrix of each of the plurality of processing cores based on respective results of the calculating.

The calculating may include calculating a first received data quantity of a first processing core of the plurality of processing cores for a first pairing among the plural pairings, where a first tile of the first pairing may be allocated to the first processing core, by calculating a size of filter data of a second tile of the first pairing, and the calculating may include differently calculating a second received data quantity of the first processing core for a second pairing among the plural pairings, where a first tile of the second pairing may be allocated to another processing core of the plurality of processing cores, by calculating a sum of a size of filter data of the second tile of the second pairing and a size of output data of the first tile of the second pairing.

For the allocation of the second tiles, the tile scheduler may be configured to allocate one or more of the second tiles to respective processing cores according to respective minimum values of the updated cost matrix of each of the plurality of processing cores.

The first tiles may include tiles corresponding to an operation of a neural network model, and the second tiles may include tiles corresponding to an operation of another neural network model.

The tiles corresponding to the operation of the other neural network model may be allocated to a portion of the plurality of processing cores, and resource allocation among the plurality of processing cores for both the neural network model and the other neural network may occur in the allocation of the second tiles.

The computing device may further include a host processor configured to generate the first tiles corresponding to the operation of the neural network model, and generate the second tiles corresponding to the operation of the other neural network model.

One of the first tiles may be dependent on output data of another one of the first tiles.

Each of the plurality of processing cores may include a corresponding tile queue, and may be configured to respectively enqueue to the corresponding tile queue one or more tiles of the second tiles dependent on which of the plurality of processing cores the second tiles are allocated to by the tile scheduler, and respectively prefetch, from an external memory, source data of the one or more tiles of the second tiles respectively enqueued to the corresponding tile queue.

Each of the plurality of processing cores nay includes a corresponding tile queue, and may be configured to request the tile scheduler to not allocate an additional tile for the corresponding tile queue when the corresponding tile queue is full.

A corresponding processing core having the corresponding tile queue that is full may be configured to complete execution of one or more tiles stored in the corresponding tile queue and, upon the corresponding tile queue no longer being full after the execution of the one or more tiles stored in the tile queue, request the tile scheduler to allocate a tile to the corresponding processing core.

Each of the plurality of processing cores may include a corresponding tile queue, and may be configured to respectively switch to a sleep mode when the corresponding tile queue is empty.

The computing device may further include a host processor configured to execute instructions, which when executed by the host processor configures the host processor to implement functions of the computing device, including compiling of the first tiles with respect to first artificial intelligence operations, and compiling of the second tiles with respect second artificial intelligence operations, where the tile scheduler may allocate multiple second tiles of the second tiles to a second set of the plurality of processing cores after allocating multiple first tiles of the first tiles to a first set of the plurality of processing cores, with at least one processing core of the second set of the plurality of processing cores executing the second artificial intelligence operation concurrently with at least one processing core of the first set of the plurality of processing cores executing the first artificial intelligence operation.

In one general aspect, a computing device may include a host including a first processor configured to generate first tiles and second tiles, and one or more second processors configured to communicate with the host, where each of the one or more second processors includes a plurality of processing cores, and a tile scheduler configured to update a cost information of each of the plurality of processing cores based on meta information of each of the first tiles, previously allocated to multiple processing cores of the plurality of processing cores and meta information of each of second tiles, and allocate one or more of the second tiles to at least one of the multiple processing cores using the updated cost information of each of the plurality of processing cores.

For the updating of the cost information, the tile scheduler may be configured to calculate, for each of the plurality of processing cores, a received data quantity for each of plural pairings among the first and second tiles based on the meta information of each of the first tiles and the meta information of each of the second tiles, and may update the cost information of each of the plurality of processing cores based on respective results of the calculating.

The calculating may include calculating a first received data quantity of a first processing core of the plurality of processing cores for a first pairing among the plural pairings, where a first tile of the first pairing is allocated to the first processing core, by calculating a size of filter data of a second tile of the first pairing, and the calculating may include differently calculating a second received data quantity of the first processing core for a second pairing among the plural pairings, where a first tile of the second pairing is allocated to another processing core of the plurality of processing cores, by calculating a sum of a size of filter data of the second tile of the second pairing and a size of output data of the first tile of the second pairing.

The updating of the cost information of each of the plurality of processing cores may include updating a cost matrix of each of the plurality of processing cores.

For the allocation of the second tiles, the tile scheduler may be configured to allocate one or more of the second tiles to respective processing cores according to respective minimum values of the updated cost information of each of the plurality of processing cores.

The first tiles may include tiles corresponding to an operation of a neural network model, and the second tiles may include tiles corresponding to an operation of another neural network model.

The tiles corresponding to the operation of the other neural network model may be allocated to the multiple processing cores, as a portion of the plurality of processing cores, and resource allocation among the plurality of processing cores for both the neural network model and the other neural network may occur in the allocation of the second tiles.

The first processor may be configured to generate the first tiles corresponding to the operation of the neural network model, and generate the second tiles corresponding to the operation of the other neural network model.

One the first tiles may be dependent on output data of another one of the first tiles.

Each of the plurality of processing cores may include a corresponding tile queue, and may be configured to respectively enqueue to the corresponding tile queue one or more tiles of the second tiles dependent on which of the plurality of processing cores the second tiles are allocated to by the tile scheduler, and respectively prefetch, from an external memory, source data of the one or more tiles of the second tiles respectively enqueued to the corresponding tile queue.

Each of the plurality of processing cores may include a corresponding tile queue, and may be configured to request the tile scheduler to not allocate an additional tile for the corresponding tile queue when the corresponding tile queue is full.

A corresponding processing core of the plurality of processing cores having the corresponding tile queue that is full may be configured to complete execution of one or more tiles stored in the corresponding tile queue and, upon the corresponding tile queue no longer being full after the execution of the one or more tiles stored in the tile queue, request the tile scheduler to allocate a tile to the corresponding processing core.

Each of the plurality of processing cores may include a corresponding tile queue, and may be configured to respectively switch to a sleep mode when the corresponding tile queue is empty.

In one general aspect, a processor-implemented method may include updating a cost matrix of each of a plurality of processing cores based on meta information of each of first tiles previously allocated to the plurality of processing cores and meta information of each of second tiles, and allocating the second tiles to the plurality of processing cores using the updated cost matrix of each of the plurality of processing cores.

The plurality of processing cores may be processing cores of a neural processor configured in communication with a memory controller configured to perform the allocating of the second tiles.

The method may further include generating the first tiles and the second tiles using a compiler of a host processor.

The updating may include calculating, for each of the plurality of processing cores, a received data quantity for each of plural pairings among the first and second tiles based on the meta information of each of the first tiles and the meta information of each of the second tiles, and updating the cost matrix of each of the plurality of processing cores based on respective results of the calculating.

The calculating may include calculating a first received data quantity of a first processing core of the plurality of processing cores for a first pairing among the plural pairings, where a first tile of the first pairing is allocated to the first processing core, by calculating a size of filter data of a second tile of the first pairing, and the calculating may include differently calculating a second received data quantity of the first processing core for a second pairing among the plural pairings, where a first tile of the second pairing is allocated to another processing core of the plurality of processing cores, by calculating a sum of a size of filter data of the second tile of the second pairing and a size of output data of the first tile of the second pairing.

Other features and aspects will be apparent from the following detailed description, the drawings, and the claims.

BRIEF DESCRIPTION OF THE DRAWINGS

FIGS. 2 through 7 illustrate examples of tile scheduling of a processing device.

Figure 1:
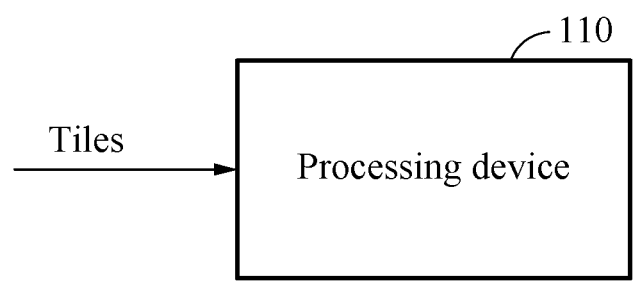
FIG. 1 illustrates an example of a processing device.

Throughout the drawings and the detailed description, unless otherwise described or provided, the same drawing reference numerals will be understood to refer to the like or the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

FIG. 1 illustrates an example of a processing device.

Referring to FIG. 1, a processing device 110 may be a neural processing unit (NPU), for example. The NPU may also be referred to as a neural processor or an artificial intelligence (AI) processor. According to implementation, the processing device 110 may be a parallel operation accelerator, for example, a domain-specific processor. The processing device 110 may also be representative of computing devices, such as the computing device examples of FIGS. 12-13, as non-limiting examples.

The processing device 110 may allocate tiles received from a host to multiple cores of the processing device 110 by performing scheduling on the received tiles. For example, implicit forwarding may occur maximally, e.g., a transmitted data quantity toward each of the cores in the processing device 110 may be reduced or minimized and the utilization of the processing device 110 may be improved over previous approaches.

In addition, the processing device 110 may perform or support concurrent model execution through such tile scheduling. That is, through such dynamic scheduling, the processing device 110 may perform dynamic core allocation between neural network (NN) models, and may fairly distribute (or allocate) or redistribute (or reallocate) resources (e.g., core, memory, etc.) to each NN model. For example, the processing device 110 may concurrently process or execute multiple NN models, NN model layers, or NN operations, reducing or minimizing the number of idle cores in the processing device 110, and improve the utilization of the processing device 110.

In addition, each of the cores in the processing device 110 may enqueue an allocated tile to the tile queue of the respective cores, and each of the cores may prefetch source data of the tile enqueued to the respective tile queue from an external memory (e.g., from a level 2 [L2] memory). For example, each of the cores in the processing device 110 may prefetch respective source data of a respectively allocated tile before executing that tile, and it may be possible to reduce or minimize a latency that may occur in data transmission and reception.

Figure 2:
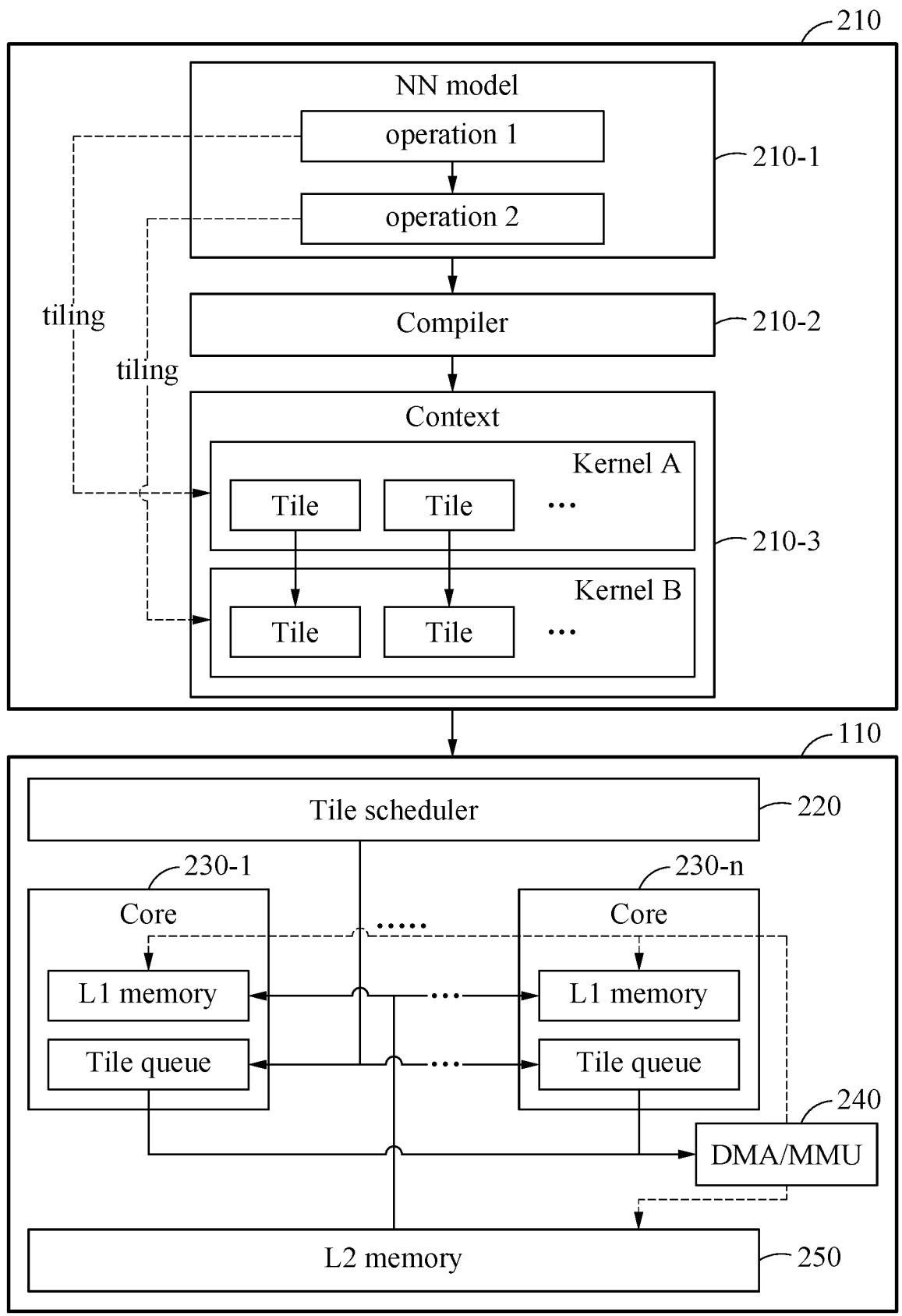

Referring to FIG. 2, a host 210 may include a compiler 210-2, and a processing device 110, e.g., the processing device 110 of FIG. 1, that may include a tile scheduler 220, a plurality of cores 230-1 through 230-*n*, a direct memory access (DMA)/memory management unit (MMU) (DMA/MMU) 240, and an L2 memory 250, for example. The neural network (NN) 210-1 may be representative of stored parameters and hyperparameters, e.g., stored in a represented memory of the host 210, of one or more or all layers of one or more corresponding neural networks. In an example, the tile scheduler 220 may also be one or more processors separate from the processing device 110.

The compiler 210-2 may compile a NN model 210-1 to allocate or map operations to multiple cores, for example, such as by setting up a context 210-3. For example, the compiler 210-2 may perform tiling on each of multiple operations (e.g., matrix-matrix multiplications, etc.) of the NN model 210-1 to generate tiles corresponding to each of the operations. For example, the compiler 210-2 may divide or separate each of the kernel implementations in the example context 210-3 into respective tiles for each kernel.

In typical compiling processes, tiles may be allocated or mapped to particular cores by a compiler of a host, meaning that that host may instruct core-dependent tiling to be performed.

In one or more examples, the tile scheduler 220 of the processing device may allocate tiles to multiple cores, and thus, implementation of the compiler 210-2 may result is core-independent tiling to be performed by the processing device. That is, while a compiler, such as compiler 210-2, may generate tiles that are allocatable to a core, the tile scheduler 220 may ultimately allocate the tiles to respective cores. The NN model for which the tiles may be generated and allocated may be a deep neural network (DNN) model and may include, for example, a convolutional neural network (CNN) or include one or more convolutional layers, but examples are not limited thereto in other various examples.

Figure 3:
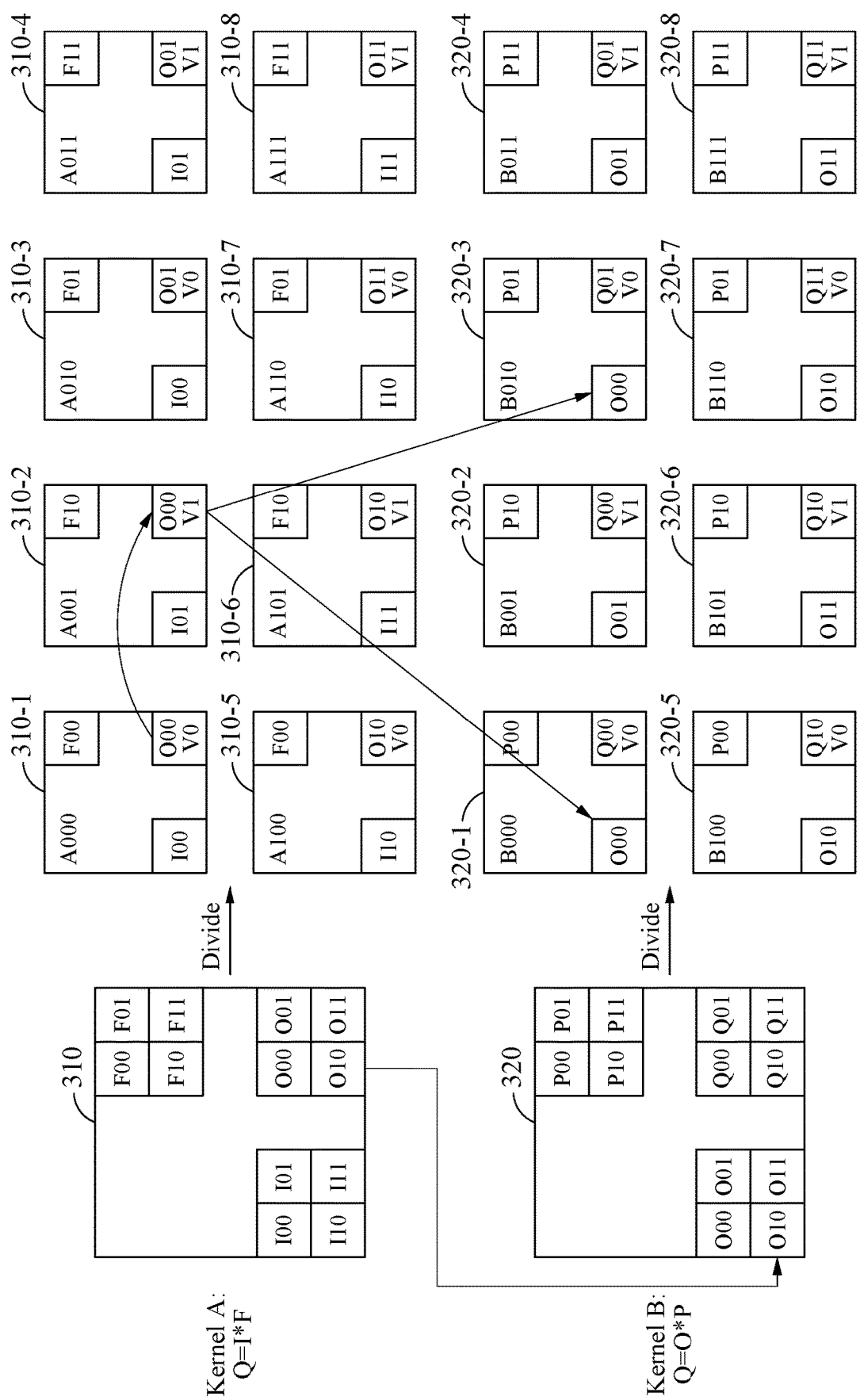

Referring to FIG. 3, a compiler divides a kernel A into tiles 310-1 through 310-8 (also identified as tiles A000-A111). For example, for non-limiting purposes to expedite explanation, the compiler may be the compiler 210-2 of FIG. 2.

In the tiles 310-1 through 310-8, respectively, I00 through I11 indicate input data (or input feature maps [IFMs]) of the tiles 310-1 through 310-8, and F00 through F11 indicate filter data (or filter tiles) of the tiles 310-1 through 310-8. I00 through I11 may be generated as an IFM(I) is divided by the compiler 210-2, and F00 through F11 are generated as a filter F is divided by the compiler 210-2. Although each of the tiles 310-1 through 310-8 is illustrated in FIG. 3 as referencing to input data and filter data, each of the tiles 310-1 through 310-8 may not include the respective input data and the respective filter data, but rather, include position information (or memory address) of the respective input data and respective position information (or memory address) of the filter data.

In the tiles 310-1 through 310-8, O00V0 through O11V1 indicate output data (or output feature maps [OFMs]) of the tiles 310-1 through 310-8, respectively. Although each of the tiles 310-1 through 310-8 is illustrated in FIG. 3 as referencing output data, each of the tiles 310-1 through 310-8 does not include the output data, but includes information associated with which output data is to be generated. For example, each of the tiles 310-1 through 310-8 may include information as to whether a convolution operation is to be performed on the input data and the filter data of each of the tiles 310-1 through 310-8.

The tile 310-1 and the tile 310-2 are, for example, tiles for output data O00.

Figure 4:
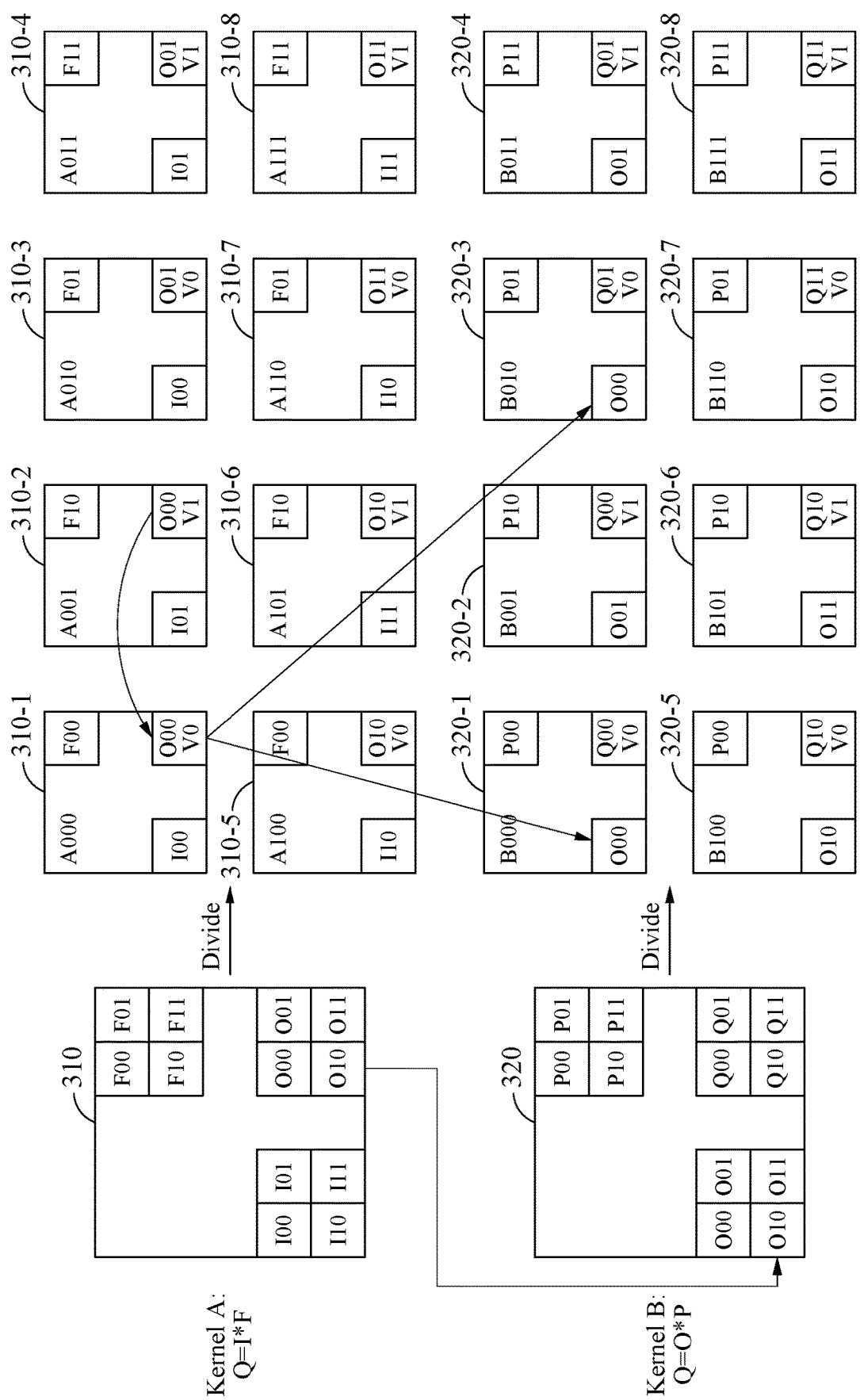

The tile 310-1 and the tile 310-2 are dependent on each other. Based on which one of the tile 310-1 and the tile 310-2 is to be allocated to a core first, a direction of their dependency may be determined. For example, in a case in which the tile 310-1 is allocated before the tile 310-2, the tile 310-2 may be dependent on output data (O00V0=I00*F00) of the tile 310-1, as illustrated in FIG. 3. In this example, output data O00V1 of the tile 310-2 may correspond to I01*F10+O00V0. As another example, in a case in which the tile 310-2 is allocated before the tile 310-1, the tile 310-1 may be dependent on the output data (O00V1=I01*F10) of the tile 310-2, as illustrated in FIG. 4. In this example, the output data O00V0 of the tile 310-1 may correspond to I00*F00+O00V1.

As further examples, tile 310-3 and the tile 310-4 are tiles for output data O01, the tile 310-5 and the tile 310-6 are tiles for output data O10, and the tile 310-7 and the tile 310-8 are tiles for output data O11. Similar to the dependency between the tiles 310-1 and 310-2, there may thus be a dependency between the tiles 310-3 and 310-4, a dependency between the tiles 310-5 and 310-6, and a dependency between the tiles 310-7 and 310-8. Further detailed description of such dependencies will be omitted here for brevity considering the example dependencies between tiles 310-1 and 310-2 have already been discussed.

The compiler may divide a kernel B into tiles 320-1 through 320-8 (also identified as tiles B000-B111).

In the tiles 320-1 through 320-8, respectively O00 through O11 indicate input data of the tiles 320-1 through 320-8. As described above in the case in which the tile 310-1 is allocated before the tile 310-2, input data O00 of the tile 320-1 and input data O00 of the tile 320-3 may correspond to the output data O00V1 of the tile 310-2, as illustrated in FIG. 3. Rather, in the case in which the tile 310-2 is allocated before the tile 310-1, the input data O00 of the tile 320-1 and the input data O00 of the tile 320-3 may correspond to the output data O00V0 of the tile 310-1, as illustrated in FIG. 4. For a further detailed description of each of inputs O01 through O11, reference may be made to the foregoing description of the inputs O00, and thus a repeated description will be omitted here for brevity.

In the tiles 320-1 through 320-8, P00 through P11 indicate filter data (or filter tiles) of the tiles 320-1 through 320-8. P00 through P11 are generated as a filter P is divided by the compiler, e.g., by the compiler 210-2.

In the tiles 320-1 through 320-8, Q00V0 through Q11V1 indicate respective output data (or OFM tiles) of the tiles 320-1 through 320-8.

Although each of the tiles 320-1 through 320-8 is illustrated in FIG. 3 as referencing input data, filter data, and output data, each of the tiles 320-1 through 320-8 may respectively include position information of the input data, position information of the filter data, and information as to which operation is to be performed on the respective input data and filter data.

Accordingly, as discussed above, a processing device, such as the processing device 110, may receive the tiles 310-1 through 310-8 from the host 210. L2 memory of the processing device, e.g., the L2 memory 250 of the processing device 110 of FIG. 2, may store the respective input data and filter data of each of the tiles 310-1 through 310-8.

For explanation purposes only, the processing device will be discussed as including cores 1 through 4, noting that examples exist with less than 4 cores and examples exist with more than 4 cores.

The tile scheduler of the processing device, e.g., the tile scheduler 220 of FIG. 2, calculates a received data quantity of each of cores 1 through 4 for the tiles 310-1 through 310-8 based on meta information of/for each of the tiles 310-1 through 310-8, and the tile scheduler may determine or update comparative costs, e.g., using a cost matrix, of each of the cores 1 through 4 based on a result of the calculated received data quantity of each of the cores 1 through 4. The meta information of each of the tiles 310-1 through 310-8 may include respective sizes of the input data of each of the tiles 310-1 through 310-8 and respective sizes of the filter data of each of the tiles 310-1 through 310-8. The meta information may be provided by the host, for example, such as by the compiler of the host.

For example, using the respective sizes of the input data and the respective sizes of the filter data of each of the tiles 310-1 through 310-8, the tile scheduler calculates a received data quantity by which core 1 receives corresponding input data and filter data of each of the tiles 310-1 through 310-8 from the L2 memory. Table 1 provides an example of calculated received data quantities S of core 1 for each of the tiles 310-1 through 310-8.

TABLE 1

| Tile (310-1) | $S_{A000}$ = Size of I00 + Size of F00 |
|---|---|
| Tile (310-2) | $S_{A001}$ = Size of I01 + Size of F10 |
| Tile (310-3) | $S_{A010}$ = Size of I00 + Size of F01 |
| Tile (310-4) | $S_{A011}$ = Size of I01 + Size of F11 |
| Tile (310-5) | $S_{A100}$ = Size of I10 + Size of F00 |
| Tile (310-6) | $S_{A101}$ = Size of I11 + Size of F10 |
| Tile (310-7) | $S_{A110}$ = Size of I10 + Size of F01 |
| Tile (310-8) | $S_{A111}$ = Size of I11 + Size of F11 |

The input data of each of the tiles 310-1 through 310-8 is divided from the IFM(I), and thus the size of the input data of each of the tiles 310-1 through 310-8 may be equal. In addition, the filter data of each of the tiles 310-1 through 310-8 is divided from the filter F, and thus the size of the filter data of each of the tiles 310-1 through 310-8 may be equal. Thus, in Table 1 above, $S_{A000}$ through $S_{A111}$ may be equal. Likewise, a received data quantity, which is an amount of the input data and the filter data of each of the tiles 310-1 through 310-8 that is received by each of cores 2 through 4 from the L2 memory, may be the same for each of cores 2 through 4.

The comparative costs of each of cores 1 through 4 may be determined or updated based on the calculated received data quantity of each of cores 1 through 4 for each of the tiles 310-1 through 310-8, and thus the determined or updated comparative costs, e.g., using the cost matrix, of each of cores 1 through 4 may be the same for each of cores 1 through 4.

When the comparative costs of each of cores 1 through 4 is the same, a tile scheduler of the processing device, e.g., the tile scheduler 220 of FIG. 2, may allocate tiles having overlapping portions to a same core.

For example, the tiles 310-1 and 310-3 may have the input data 100 as an overlapping portion, and thus the tile scheduler allocates the tiles 310-1 and 310-3 to core 1 (e.g., core 230-1 of FIG. 2). The tiles 310-2 and 310-4 have the input data 101 as an overlapping portion, and thus the tile scheduler allocates the tiles 310-2 and 310-4 to core 2. Similarly, the tiles 310-5 and 310-7 have the input data 110 as an overlapping portion, and thus the tile scheduler allocates the tiles 310-5 and 310-7 to core 3. In addition, the tiles 310-6 and 310-8 have the input data 111 as an overlapping portion, and thus the tile scheduler allocates the tiles 310-6 and 310-8 to core 4, and this be continued until one or more final tiles that have input data as an overlapping portion may be allocated to the n-th core (e.g., core 230-n of FIG. 2) when there are such additional cores. Table 2 below indicates an example where the tile scheduler allocates the tiles 310-1 through 310-8 to the example cores 1 through 4.

TABLE 2

| Core 1 | Tiles 310-1 and 310-3 |
|---|---|
| Core 2 | Tiles 310-2 and 310-4 |
| Core 3 | Tiles 310-5 and 310-7 |
| Core 4 | Tiles 310-6 and 310-8 |

As another example, the tiles 310-1 and 310-5 have the filter data F00 as an overlapping portion, and thus the tile scheduler may allocate the tiles 310-1 and 310-5 to core 1. The tiles 310-2 and 310-6 have the filter data F10 as an overlapping portion, and thus the tile scheduler allocates the tiles 310-2 and 310-6 to core 2. Similarly, the tiles 310-3 and 310-7 have the filter data F01 as an overlapping portion, and thus the tile scheduler allocates the tiles 310-3 and 310-7 to core 3. In addition, the tiles 310-4 and 310-8 have the filter data F11 as an overlapping portion, and thus the tile scheduler allocates the tiles 310-4 and 310-8 to core 4.

Depending on example implementations, in a case in which the tiles 310-1 through 310-8 correspond to tiles received first, the tile scheduler may allocate the tiles 310-1 through 310-8 to cores 1 through 4, e.g., without calculating or using the comparative costs of each of cores 1 through 4. In such a case, the tile scheduler may also allocate tiles having such overlapping portions to a same core.

For example, when the tiles 310-1 through 310-8 are allocated to cores 1 through 4 as indicated in Table 2 above, a point in time at which the tile 310-1 is allocated to core 1 may precede a point in time at which the tile 310-2 is allocated to core 2. In such an example, core 2 generates the output data O00V1 that depends on the output data O00V0 of the tile 310-1 allocated to core 1. For example, core 1 generates the output data O00V0 by performing a convolution operation on the input data I00 and the filter data F00 of the tile 310-1. In this example, core 2 generates I01*F10 by performing a convolution operation on the input data I01 and the filter data F10 of the tile 310-2, receives the output data O00V0 of the tile 310-1 from core 1, and generates the output data O00V1 of the tile 310-2 by adding 101*F10 and O00V0. Continuing this example, core 2 thus stores the output data O00V1 of the tile 310-2 in a level 1 (L1) memory of core 2. As another example, in a case in which a point in time at which the tile 310-2 is allocated to core 2 precedes a point in time at which the tile 310-1 is allocated to core 1, core 1 receives the output data O00V1 of the tile 310-2 from core 2, and generates the output data O00V0 by adding I00*F00 and O00V1. Core 1 thus stores the output data O00V0 of the tile 310-1 in an LI memory of core 1.

Similar to how core 1 executes the tile 310-1 and core 2 executes the tile 310-2, core 1 may execute the tile 310-3 and core 2 may execute the tile 310-4, and core 3 may execute the tiles 310-5 and 310-7 and core 4 may execute the tiles 310-6 and 310-8.

The tile scheduler allocates the tiles 320-1 through 320-8 received from the host, such as the host 210 of FIG. 2, respectively to cores 1 through 4. Here, the tile scheduler determines or updates comparative costs, e.g., using a cost matrix, of each of cores 1 through 4 based on the meta information of each of the previously allocated tiles 310-1 through 310-8 and meta information of each of the tiles 320-1 through 320-8, and allocates the tiles 320-1 through 320-8 to cores 1 through 4 based on the determined or updated comparative costs of each of cores 1 through 4.

For this, the tile scheduler calculates the received quantity of/for each of cores 1 through 4 for each of example received data quantities between parings of tiles, using the meta information of each of the tiles 310-1 through 310-8 and the meta information of each of the tiles 320-1 through 320-8. The received data quantities between the parings of tiles may include calculated received data quantity between each of respective pairings of each of the tiles 310-1 through 8 and each of the tiles 320-1 through 320-8. As another example, for each of the cores 1 through 4, the comparative costs may include a received data quantity cost for a pair of the tile 310-1 and the tile 320-1, a received data quantity cost for a pair of the tile 310-1 and the tile 320-2, a received data quantity cost for a pair of the tile 310-1 and the tile 320-3, . . . , a received data quantity cost for a pair of the tile 310-2 and the tile 320-2, a received data quantity cost for a pair of the tile 310-2 and the tile 320-3, a received data quantity cost for a pair of the tile 310-2 and the tile 320-4, . . . , a received data quantity cost for a pair of the tile 310-3 and the tile 320-4, a received data quantity cost for a pair of the tile 310-3 and the tile 320-5, a received data quantity cost for a pair of the tile 310-3 and the tile 320-6, . . . , a received data quantity cost for a pair of the tile 310-4 and the tile 320-5, a received data quantity cost for a pair of the tile 310-4 and the tile 320-6, a received data quantity cost for a pair of the tile 310-4 and the tile 320-7, . . . , a pair of the tile 310-5 and the tile 320-3, a pair of the tile 310-5 and the tile 320-4, . . . , a pair of the tile 310-6 and the tile 320-6, a pair of the tile 310-6 and the tile 320-7, . . . , a pair of the tile 310-7 and the tile 320-3, a pair of the tile 310-7 and the tile 320-4, . . . , a pair of the tile 310-8 and the tile 320-7, and a pair of the tile 310-8 and the tile 320-8. As discussed above and further below, FIG. 7 also demonstrates the respective comparative costs of these pairings in the cost matrix form, noting the use of the cost matrix for such respective comparative costs is only an example and examples are not limited thereto. Regardless, for convenance of explanation such respective comparative costs for each of the cores will be discussed through the cost matrix form.

Figure 5:
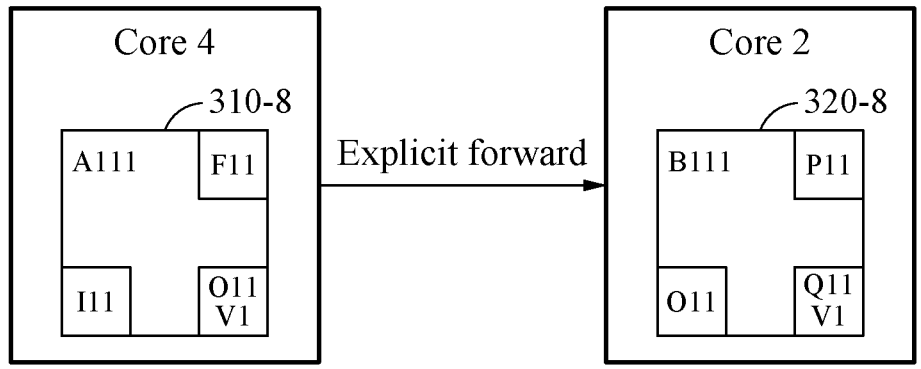
Figure 6:
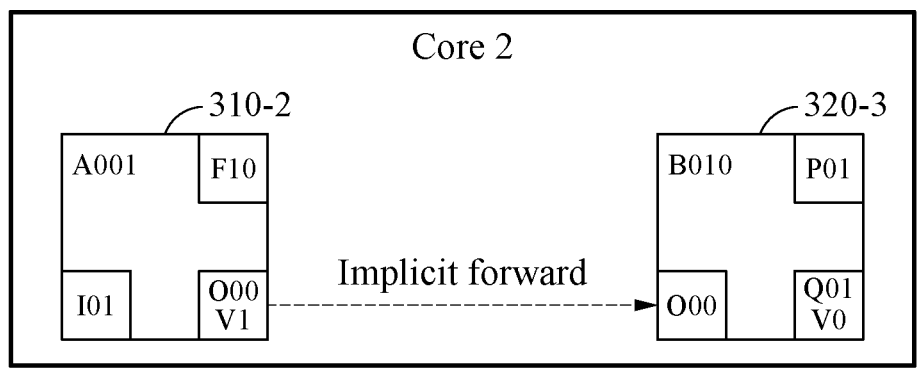

For example, FIG. 5 illustrates an example of how a tile scheduler, e.g., the tile scheduler 220 of FIG. 2, calculates a received data quantity $S_{A111-B111}$ of the cost matrix of core 2 for the pairing of the tiles 310-8 and 320-8, demonstrating the core 2 calculation of the output Q11V1 occurring subsequent to the core 4 calculation of the output O11V1, with the output O11V1 having to be explicitly forwarded to the core 2 for the calculation of the output Q11V1. FIG. 6 illustrates an example of how the tile scheduler, e.g., the tile scheduler 220 of FIG. 2, calculates a received data quantity $S_{A001-B010}$ of core 2 for the pairing of the tiles 310-2 and 320-3. In this example, the output O00V1 with respect to the tile 310-2 may be stored in the L1 memory of the core 2 for the subsequent calculation of the output Q01V0 with respect to the tile 320-3.

For example, referring to FIG. 5, core 4 receives the allocated tile 310-8 and executes the tile 310-8, and stores output data O11V1 in an L1 memory of core 4. As illustrated, output data O11V1 of the tile 310-8 is input data O11 of the tile 320-8.

However, as noted, the input data O11 of the tile 320-8 is stored in the L1 memory of core 4, and thus core 2 may receive, from the L1 memory of core 4, the input data O11 of the tile 320-8 in the pairing of the tiles 310-8 and 320-8. In other words, the tile 310-8 is allocated to core 4, and thus explicit forwarding may occur between core 2 and core 4 for the pairing of the tiles 310-8 and 320-8. In addition, filter data P11 of the tile 320-8 may be stored in the L2 memory of the processing device, e.g., L2 memory 250 of FIG. 2, and thus core 2 may also receive the filter data P11 of the tile 320-8 from the L2 memory for the execution of the tile 320-8.

Thus, in the pairing of the tiles 310-8 and 320-8, a data transfer corresponding to a size of the input data O11 of the tile 320-8 and a data transfer corresponding to a size of the filter data P11 of the tile 320-8 may occur. The tile scheduler then calculates a sum of the size of the filter data P11 of the tile 320-8 and the size of the input data O11 of the tile 320-8 as the received data quantity $S_{A111-B111}$ of the cost matrix of core 2 with respect to the pairing of the tiles 310-8 and 320-8.

Referring to FIG. 6, core 2 receives the allocated tile 310-2 and executes the allocated tile 310-2, and then the core 2 stores the output data O00V1 in the L1 memory of core 2. The output data O00V1 of the tile 310-2 then becomes the input data O00 of the tile 320-3.

In this example pairing, the input data O00 of the tile 320-3 is already stored in core 2, and thus core 2 may not need to receive (or wait on reception of) the input data O00 of the tile 320-3 from another core. In other words, with the tile 310-2 being allocated to core 2, and the tile scheduler having scheduled the tile 320-3 to be executed by core 2, there is merely an implicit forwarding (or in-core sharing) that occurs in core 2 for the pairing of the tiles 310-2 and 320-3. In addition, the filter data P11 of the tile 320-8 may be stored in the L2 memory of the processing device, and thus core 2 may receive the filter data P11 of the tile 320-8 from the L2 memory for when the tile 320-8 is executed by core 2.

In other words, in the pairing of the tiles 310-2 and 320-3, a data transfer corresponding to merely the size of filter data P01 of the tile 320-3 may occur. However, dissimilar to what is described above with reference to of FIG. 5, a data transfer corresponding to the size of the input data O00 may not occur, as the input data O00 is already stored in the L1 memory of core 2. The tile scheduler calculates the size of the filter data P01 of the tile 320-3 as a received data quantity $S_{A001-B010}$ of the cost matrix of core 2 with respect to the pairing of the tiles 310-2 and 320-3.

Similar to the examples described above with reference to FIGS. 5 and 6, the tile scheduler may calculate a received data quantity of core 2 for each of the remaining pairings, e.g., for remaining tiles to be allocated. In addition, the tile scheduler may calculate a received data quantity of each of remaining cores for each pairing.

For example, the tile scheduler updates the cost matrix of each of cores 1 through 4, for example, using the calculated received data quantity of each of cores 1 through 4 for each of the pairings.

As noted above, an example of the updated cost matrix of core 2 is illustrated in FIG. 7.

For example, the tile scheduler allocates the tiles 320-1 through 320-8 to cores 1 through 4 using the updated cost matrix of each of cores 1 through 4. In the updated cost matrix of core 2 illustrated in FIG. 7, the tile scheduler verifies or determines a tile corresponding to a minimum value (e.g., a minimum calculated received data quantity), and allocates the verified/determined tile to core 2 before other allocations to core 2. For example, when $S_{A001-B010}$ is minimum among the remaining calculated received data quantities, the tile scheduler allocates, to core 2, the tile B010 (that is, the tile 320-3) corresponding to $S_{A001-B010}$. Likewise, the tile scheduler similarly respectively allocates, to core 1, core 2, and core 4, the tile that corresponds to the respective calculated minimum values in each of the cost matrices of core 1, core 2, and core 4. Thus, the tile scheduler may allocate the tiles 320-1 through 320-8 to cores 1 through 4 such that implicit forwarding may occur maximally, and thus may improve utilization of cores in processing devices.

Table 3 below indicates an example where the tile scheduler allocates the tiles 320-1 through 320-8 to cores 1 through 4.

TABLE 3

| Core 1 | Tiles 320-1 and 320-2 |
|---|---|
| Core 2 | Tiles 320-3 and 320-4 |
| Core 3 | Tiles 320-5 and 320-6 |
| Core 4 | Tiles 320-7 and 320-8 |

Each of cores 1 through 4 may include a tile queue, and thus, each of cores 1 through 4 enqueues tiles allocated to each of cores 1 through 4 among the tiles 320-1 through 320-8 to its own tile queue, and accordingly, respectively prefetches necessary data from the L2 memory through a DMA/MMU, e.g., from the L2 memory 250 through the DMA/MMU 240 of FIG. 2, which will be described in greater detail with reference to FIG. 9.

In an example, the processing device may further include a context manager, e.g., the processing device may be the processing device 110 of FIGS. 1 and 2, and/or any of the processing devices of FIGS. 8 and 12-13 described further below. For example, the context manager may manage resource information of the example context 210-3 (or the example neural network model 210-1). For example, the example context manager of the processing device may record which cores are allocated with respect to the context 210-3.

Figure 8:
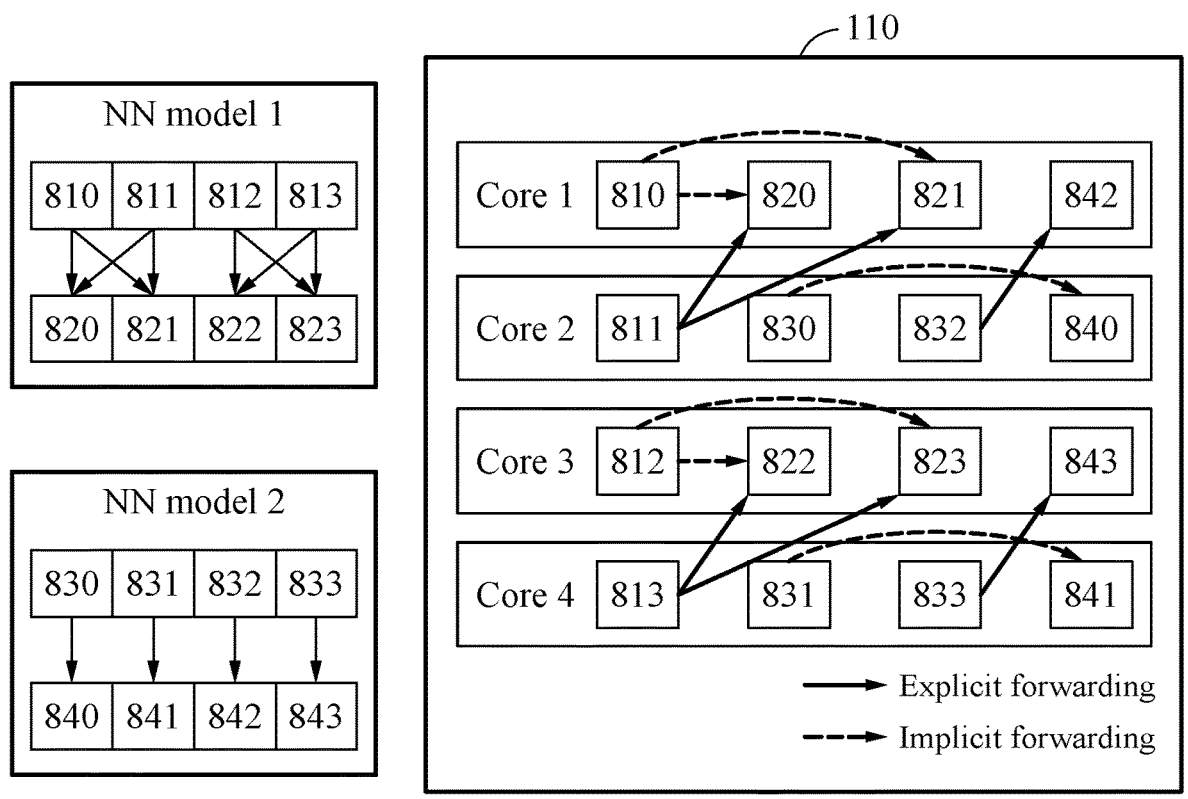
FIG. 8 illustrates an example of tile scheduling with concurrent model execution.

FIG. 8 illustrates an example of tile scheduling with concurrent model execution.

Referring to FIG. 8, NN model 1 is executed. For example, execution of one or more layers of the NN model 1 may be requested by a host. For example, functions of a computing device may be implemented through executing the NN model 1, including the use of one or more processing devices 110 that respectively have multiple processing cores. As a non-limiting example, the host may be the host 210 of FIG. 2, as well as the hosts of FIGS. 12 and 13, and the one or more processing devices 110 may be respective neural processors or accelerators having multiple processing cores. Each processing device 110 may have a tile scheduler, one or more L2 memories, for example, and each core of the processing devices may have respective L1 memories as well as tile queues. In an example, the processing device 110 may correspond to the processing devices 110 of FIGS. 1 and 2, the processor 1210, and/or processing device 1310 of FIG. 13. In an example, the tile scheduler may be any of the tile schedulers described above with respect to FIGS. 1-7.

The tile scheduler allocates tiles 810 through 813 to cores 1 through 4, respectively. Cores 1 through 4 are distributed, and thus, may respectively perform neural network operations of the NN model 1. In the example of FIG. 8, tiles 810 through 813 may not have respective dependencies to each other, though subsequently executed tiles 820 through 823 may have varied dependencies from the executed operations of one or more of the files 810 through 813.

An NN model 2 may be requested by the host to be executed in the processing device. As a non-limiting example the neural network operations of the NN model 2 may be executed by cores of the processing device subsequent to the implementation of the execution of tiles 810 through 813 by the cores.

For example, when operations of the NN model 2 are executed, or requested for execution by the host, the tile scheduler allows a portion of the cores most recently distributed to NN model 1 to be distributed to NN model 2, e.g., while operations of the NN model 1 are still being, or will still be, executed by cores other than the portion of the cores. In other words, when NN model 2 is executed, the tile scheduler may dynamically redistribute (or reallocate), to NN model 2, resources previously or currently distributed to NN model 1. Thus, resources of the processing device may be distributed fairly, and thus a plurality of NN models and/or neural network operations may be concurrently executed. As another example, resources for different layer operations of the NN model 1 may also similarly be dynamically allocated, e.g., along with the operations 820 through 823 of NN model 1 and tiles 830 through 833 and tiles 840 through 842 of NN model 2.

As an example, the tile scheduler may perform tile scheduling on tiles 820 through 823 of NN model 1, and may allocate resources for tiles 830 through 833 of NN model 2. As illustrated in FIG. 8, the tile scheduler allocates the tiles 820 and 821 of NN model 1 to core 1, and allocates the tiles 822 and 823 of NN model 1 to core 3. The tile scheduler allocates the tiles 830 and 832 of NN model 2 to core 2, and the allocates tiles 831 and 833 of NN model 2 to core 4.

The tile scheduler allocates tiles 840 through 843 of NN model 2 to cores 1 through 4 through such dynamic tile scheduling. As illustrated in FIG. 8, the tile scheduler may allocate the tile 840 to core 2, and the tile 841 to core 4. The tile scheduler allocates the tile 842 to core 1, and the tile 843 to core 3.

The methods, operations, and host and processing device discussions above with respect to FIGS. 1 through 7, as well as discussions below respect to FIGS. 9-13, are also applicable to the operations of the processing device 110 of FIG. 8, and thus a repeated description will be omitted here for brevity.

Figure 9:
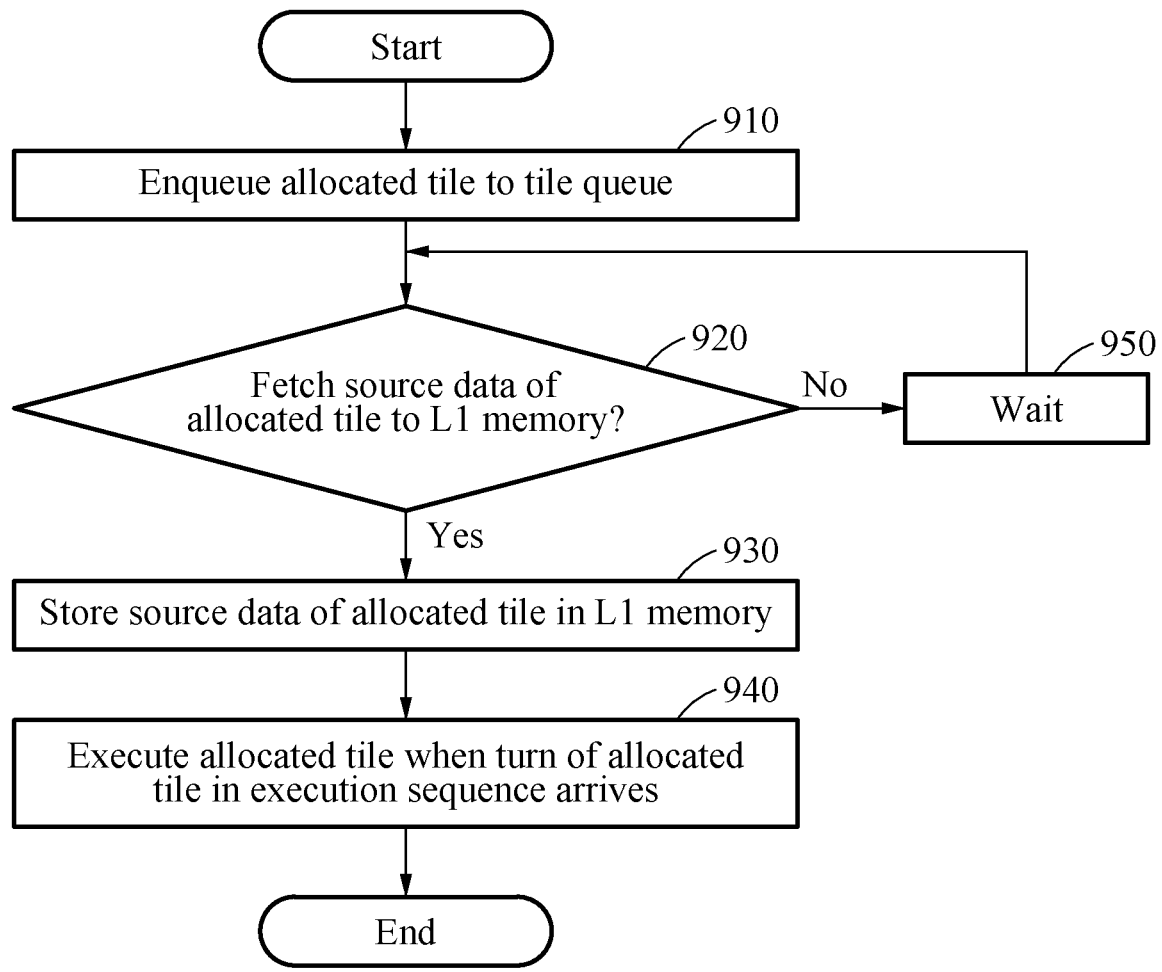
FIGS. 9 and 10 illustrate an example of a tile queue operation of a processing device.
Figure 10:
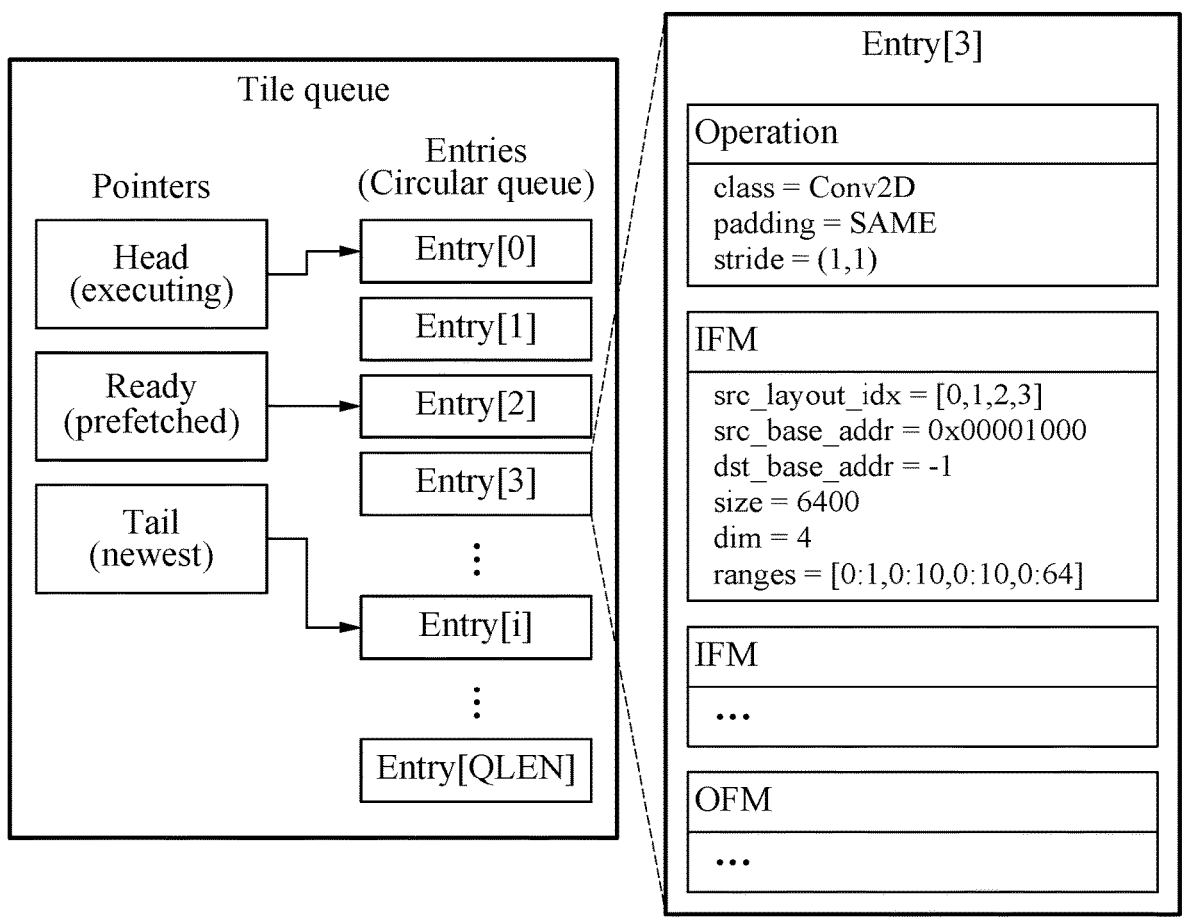

FIGS. 9 and 10 illustrate an example of a tile queue operation of a processing device.

A core 2 of a processing device including at least a core 1 and the core 2, may operates a tile queue of the core 2. Such following descriptions regarding the example core 2 may also be applied to an operation of respective tile queues of the other cores in the processing device, e.g., a tile queue of the core 1 of the processing device. The processing device may correspond to the processing devices of FIGS. 1 and 2, the processor 1210, and/or processing device 1310 of FIG. 13.

Referring to FIG. 9, in operation 910, core 2 enqueues an allocated tile to a tile queue. For example, when tiles 320-3 and 320-4 are allocated to core 2 in the above examples of FIGS. 3-6, core 2 may enqueue the tiles 320-3 and 320-4 to the tile queue of core 2. For example, FIG. 6 demonstrates the example where the example core 2 may be executing neural network operations for tile 310-2, while such tiles 320-3 and 320-4 may be enqueued. Additional neural networks or neural network operations may also be newly allocated by a tile scheduler, e.g., such as any of the tile scheduler described above with respect to FIGS. 1-8, of the processing device after the example tile 310-2 has been allocated and the tile 310-2 is executed by core 2, for example.

Thus, in operation 920, dependent on the enqueuing of the allocated tile 320-3 and 320-4, for example, core 2 determines whether to fetch source data of the allocated tile to an L1 memory of the core 2, for example. When the neural network operation is a convolutional neural network operation, for example, the source data may include input data and/or filter data of the tiles 320-3 and 320-4. For example, as described above with reference to FIG. 6, the input data O00 (resulting from the execution of tile 310-2 by core 2) of the tile 320-3 is stored in the L1 memory of core 2. In this example, when there is an available space in the L1 memory of core 2, core 2 may select to fetch the filter data P01 of the tile 320-3 from the L2 memory of the processing device, for example, to the L1 memory of core 2. However, when the core 2, the processing device, and/or host determine that there is no available space in the L1 memory of core 2, e.g., sufficient for the filter data P01, core 2 may determine or select to not fetch the filter data P01 of the tile 320-3 from the L2 memory to the L1 memory of core 2.

In operation 930, in response to the determination or selection that core 2 is to fetch the source data of the allocated tile to the L1 memory, core 2 stores the source data of the allocated tile in the L1 memory. In operation 950, in response to a determination or selection that core 2 should not fetch the source data of the allocated tile to the L1 memory, core 2 waits.

In operation 940, core 2 executes the allocated tile when a turn of the allocated tile, in an execution sequence, arrives. For example, when it is the tile 320-3's turn to be executed in an execution sequence, core 2 may dequeue the tile 320-3 and execute the tile 320-3.

For example, when the tile queue of core 2 is full, core 2 may request to the tile scheduler that the tile scheduler does not allocate an additional tile to the core 2, e.g., until the core 2 has dequeued a tile from the tile queue of core 2 by execution of one or more tiles still queued in the tile queue of core 2. For example, when the core 2 determines that the tile queue is no longer full, e.g., as core 2 completes executing one or more tiles stored in the tile queue, core 2 may request to the tile scheduler that the tile scheduler allocate a new tile to be queued in the tile queue of the core 2.

When there is no tile in the tile queue of core 2, and a new tile has not been allocated to core 2, core 2 may switch to a sleep mode. In other words, when the tile queue of core 2 is empty, core 2 may switch to the sleep mode. Core 2 may thereby reduce power consumption. When a tile is next allocated to core 2 in the sleep mode, core 2 may switch to a wake-up mode and execute the tile.

An example of a tile queue is illustrated in FIG. 10. The tile queue may be a circular queue, but examples are not limited thereto.

Referring to FIG. 10, when entry[3] of a tile queue of core 2 is empty, core 2 enqueues an allocated tile to entry[3]. Entry[3] may include information associated with an operation (e.g., two-dimensional [2D] convolution operation, stride, etc.), a memory address of input data, a size of the input data, a range of the input data, a memory address of a filter, and the like.

As shown in FIG. 10, the example tile queue may have a Head (executing) pointer to the entry [0], a Ready (prefetched) pointer to entry [2], and a Tail (newest) pointer to entry [i]. As shown in the entry [3] example, the class may be indicated as 2 dimensional (2D) convolution, with padding, and the stride (1,1) for the convolutional operation with respect to the kernel (filter) of the convolutional operation, along with information for the input feature map [IFM].

Figure 11:
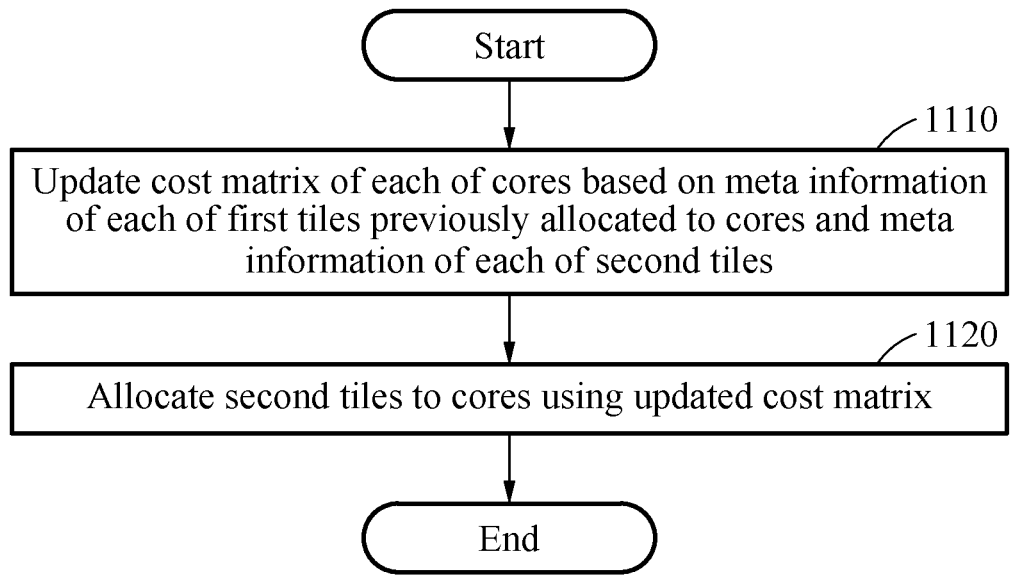
FIG. 11 illustrates a flowchart of an example of an operating method of a processing device.

FIG. 11 illustrates a flowchart of an example of an operating method of a processing device.

Referring to FIG. 11, in operation 1110, a processing device updates a cost matrix of each of multiple cores of the processing device based on meta information of each of first tiles currently allocated to the multiple cores and meta information of each of second tiles that are set to be allocated by one or more cores of the processing device.

In operation 1120, the processing device allocates the second tiles to the one or more cores based on the updated cost matrix of each of the multiple cores, for example.

The currently allocated tiles may include tiles corresponding to an operation of an NN model, and the second tiles may include tiles corresponding to an operation of another NN model, and/or tiles corresponding to another operation of the NN subsequent of the currently allocated tiles. For example, the processing device may allocate the second tiles corresponding to the operation of the other NN model to a portion of the multiple cores such that resources are dynamically distributed for execution of the other NN model. Detailed descriptions of such dynamic distributions of resources for multiple NNs and multiple cores of a processing device described above and below are applicable to the operations of FIG. 11, such as discussions with respect to FIG. 8, as non-limiting examples.

Figure 12:
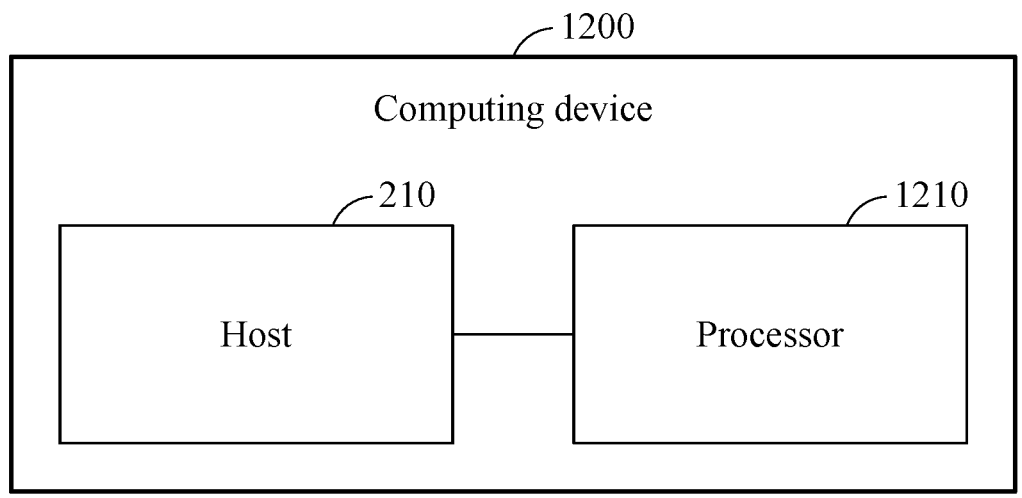
FIGS. 12 and 13 illustrates examples of a computing device.
Figure 13:
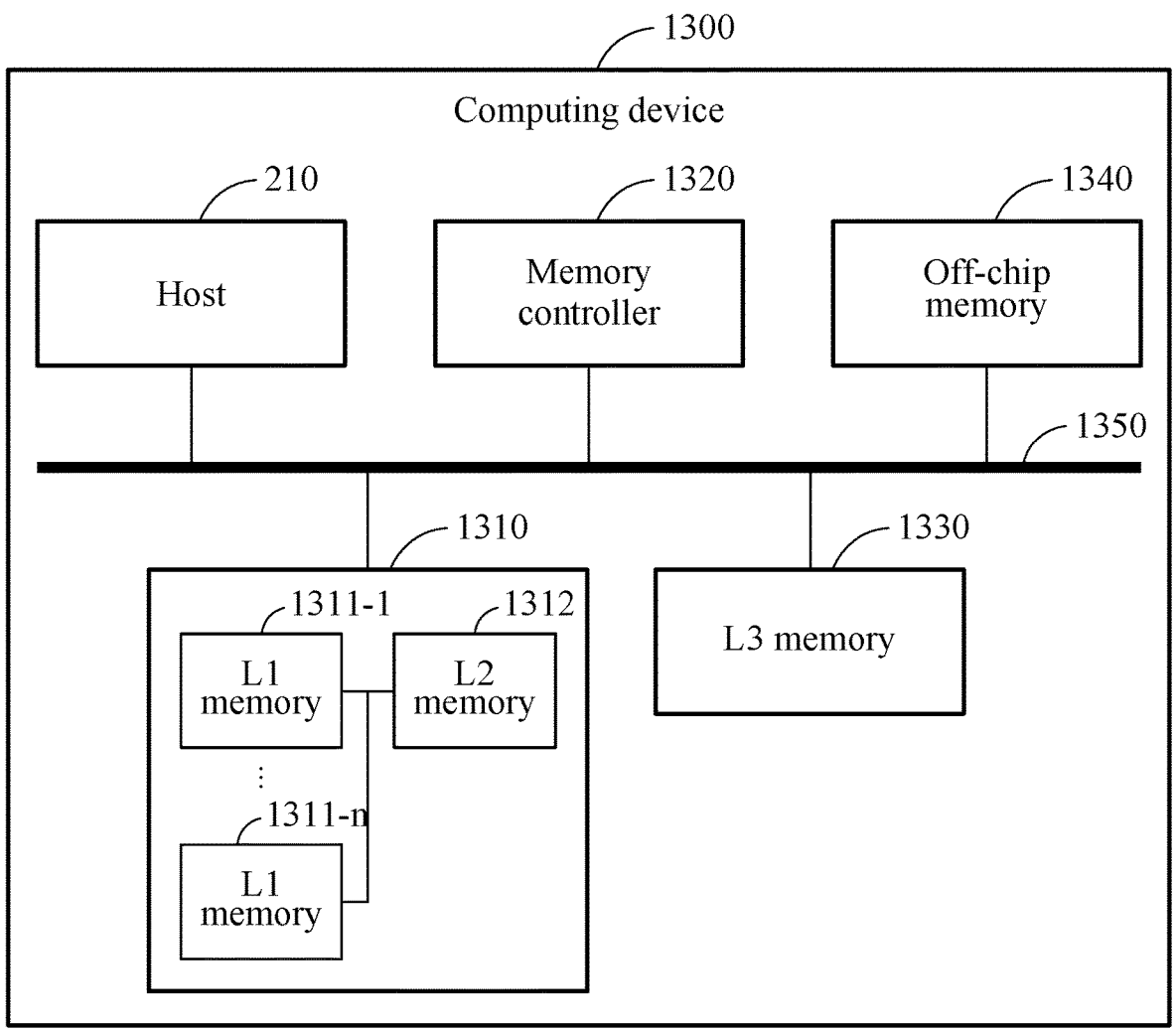

FIGS. 12 and 13 illustrates examples of a computing device.

Referring to FIG. 12, a computing device 1200 includes the host 210 and a processor 1210. The host 210 may correspond to the hosts described above, and the processor 1210 may correspond to any or any combination of the processing devices and processing devices 110 described above.

Although the computing device 1200 is illustrated in FIG. 12 as including a single processor, it is provided merely as an example and the computing device 1200 may include a plurality of processors each corresponding to any of the processing devices described above.

The computing device 1200 may be a device configured to process large amounts of data. For example, the computing device 1200 may be a server computer. However, the computing device 1200 is not limited thereto and may be a mobile terminal, such as, for example, a mobile phone and a tablet personal computer (PC).

The host 210 may include a central processing unit (CPU). The host 210 may receive an inference request from a plurality of user terminals, for example, a smartphone, a tablet PC, an Internet of things (IoT) device, and the like, and/or for a plurality of functions of the computing device 1300. The processor 1210 may generate an inference result in response to the inference request through at least one NN model. For example, the host 210 may rapidly generate the inference result by generating tiles as described above, and dynamically allocating the tiles among multiple cores through tile scheduling as described above with respect to FIGS. 1-11. The host 210 may transmit the inference result to each of the user terminals, or control operations of the computing device dependent on results of the executed NNs. For example, the inference request may be related to computer vision-based object recognition function of the computing device, a pattern recognition function of the computing device, and the like, but examples of which are not limited thereto.

Referring to FIG. 13, a computing device 1300 may include the host 210, a processor 1310, a memory controller 1320, a level 3 (L3) memory 1330, an off-chip memory 1340, and a bus 1350. The processor 1310 may correspond to any one or any combination of the processing devices described above with respect to FIGS. 1-12.

The host 210, the processor 1310, the memory controller 1320, the L3 memory 1330, and the off-chip memory 1340 may communicate with one another through the bus 1350.

Although the computing device 1300 is illustrated in FIG. 13 as including a single processor 1310, this is only an example, as the computing device 1300 may include a plurality of processors 1310.

The computing device 1300 may be a device configured to process massive or large amounts of data. For example, the computing device may be a server computer. However, the computing device 1300 is not limited thereto and may be a mobile terminal, such as, for example, a mobile phone and a tablet PC.

The processor 1310 includes a plurality of L1 memories 1311-1 through 1311-n, and an L2 memory 1312. As described above, the processor 1310 includes a plurality of cores.

In the example of FIG. 13, the memory controller 1320 may perform operations of the tile scheduler, such as the tile scheduler 220 as well as any of the tile schedulers described above with respect to FIGS. 1-12. For example, the memory controller 1320 may be separate from the processor 1310, though examples are not limited thereto. As discussed above with respect to the computing device 1200 of FIG. 12, tile scheduling may be performed at the level of the processor 1210. For the computing device 1300 described with reference to FIG. 13, the memory controller 1320 may perform the operations of the tile scheduler, and thus the tile scheduling may be performed at an upper level. Referring back to FIG. 5, for example, a portion of filter data P11 of a memory tile 320-8 may be stored in the L3 memory 1330, and remaining data of the filter data P11 may be stored in the L2 memory 1312. In such a case, the memory controller 1320 may calculate, as a received data quantity of core 2, a sum of a size of the partial filter data stored in the L3 memory 1330, a size of the remaining filter data stored in the L2 memory 1312, and a size of input data O11.

The memory controller 1320 may update a cost matrix of each of the cores in the processor 1310 and allocate tiles to the cores in the processor 1310 using the updated cost matrix of each of the cores.

The off-chip memory 1340 may be disposed outside the processor 1310. The off-chip memory 1340 may include a dynamic random-access memory (DRAM). The off-chip memory 1340 may store parameters of the NN models, but examples are not limited thereto.

Accordingly, descriptions above with respect to FIGS. 1-11 are also applicable to the examples of FIGS. 12 and 13.

The processing devices, hosts, the processors, the compiler, the tile scheduler, the processing cores, the L1, L2, and L3 memories, the tile queues, the computing devices, and other devices, apparatuses, units, and components described herein with respect to FIGS. 1-13 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A computing device comprising:
    a plurality of processing cores; and
    a tile scheduler configured to:
        determine, based on meta information of each of first tiles already allocated to the plurality of processing cores and of each of second tiles to be allocated to the plurality of processing cores, where the meta information of each of the first tiles include respective sizes of input data of each of the first tiles and respective sizes of filter data of each of the first tiles and where the meta information of each of the second tiles include respective sizes of input data of each of the second tiles and respective sizes of filter data of each of the second tiles, a cost matrix of each of the plurality of processing cores indicating a received data quantity before execution of the second tiles; and
        allocate, using the cost matrix of each of the plurality of processing cores, the second tiles to respective processing cores of the plurality of processing cores according to respective minimum values of the cost matrix of each of the plurality of processing cores;
    wherein the plurality of processing cores further generate output by executing the allocated second tiles,
    wherein each respective tile of the first and second tiles corresponds to a multi-operation process of a plurality of processes of a plurality of neural network models.

2. The computing device of claim 1, wherein, for the determining of the cost matrix of each of the plurality of processing cores, the tile scheduler is configured to:
    determine, for each of the plurality of processing cores, a received data quantity for each pairing between each of the first tiles and each of the second tiles based on the meta information of each of the first tiles and the meta information of each of the second tiles; and
    determine the cost matrix of each of the plurality of processing cores based on respective results of the determining of the received data quantity for each pairing.

3. The computing device of claim 2, wherein the determining of the received data quantity for each pairing includes:
    determining a first received data quantity of a first processing core of the plurality of processing cores for a first pairing among the pairings, where a first tile of the first pairing is allocated to the first processing core, by determining a size of filter data of a second tile of the first pairing, and
    differently determining a second received data quantity of the first processing core for a second pairing among the pairings, where a first tile of the second pairing is allocated to another processing core of the plurality of processing cores, by determining a sum of a size of filter data of a second tile of the second pairing and a size of output data of the first tile of the second pairing.

4. The computing device of claim 1, wherein each of the first tiles corresponds to a multi-operation process of a neural network model of the plurality of neural network models, and each of the second tiles corresponds to a multi-operation process of another neural network model of the plurality of neural network models.

5. The computing device of claim 4, wherein each of the second tiles corresponding to the multi-operation process of the other neural network model is allocated to a portion of the plurality of processing cores.

6. The computing device of claim 1, wherein one of the first tiles is dependent on output data of another one of the first tiles.

7. The computing device of claim 1, wherein each of the plurality of processing cores includes a corresponding tile queue, and is configured to:
    respectively enqueue to the corresponding tile queue one or more tiles of the second tiles dependent on which of the plurality of processing cores the second tiles are allocated to by the tile scheduler; and
    respectively prefetch, from an external memory, source data of the one or more tiles of the second tiles respectively enqueued to the corresponding tile queue.

8. The computing device of claim 1, wherein each of the plurality of processing cores includes a corresponding tile queue, and is configured to:
request the tile scheduler to not allocate an additional tile for the corresponding tile queue when the corresponding tile queue is full.

9. The computing device of claim 8, wherein a corresponding processing core having the corresponding tile queue that is full is configured to complete execution of one or more tiles stored in the corresponding tile queue and, upon the corresponding tile queue no longer being full after the execution of the one or more tiles stored in the corresponding tile queue, request the tile scheduler to allocate a tile to the corresponding processing core.

10. The computing device of claim 1, wherein each of the plurality of processing cores includes a corresponding tile queue, and is configured to respectively switch to a sleep mode when the corresponding tile queue is empty.

11. The computing device of claim 1, further comprising a host processor configured to execute instructions, which when executed by the host processor configures the host processor to implement functions of the computing device, including compiling the first tiles with respect to first artificial intelligence operations, and compiling the second tiles with respect second artificial intelligence operations,
wherein the tile scheduler allocates multiple second tiles of the second tiles to a second set of the plurality of processing cores after allocating multiple first tiles of the first tiles to a first set of the plurality of processing cores, with at least one processing core of the second set of the plurality of processing cores executing a respective second artificial intelligence operation concurrently with at least one processing core of the first set of the plurality of processing cores executing a respective first artificial intelligence operation.

12. The computing device of claim 1, wherein the cost matrix of each of the plurality of processing cores indicates an amount of data received from each of the first tiles and each of the second tiles.

13. The computing device of claim 1, wherein each of the first and second tiles includes position information of the respective input data, position information of the respective filter data, and information as to which operation is to be performed on the respective input data and the respective filter data.

14. A computing device comprising:
a host comprising a first processor configured to generate first tiles and second tiles; and
one or more second processors configured to communicate with the host, wherein each of the one or more second processors comprise:
a plurality of processing cores; and
a tile scheduler configured to:
determine, based on meta information of each of first tiles already allocated to the plurality of processing cores and of each of second tiles to be allocated to the plurality of processing cores, where the meta information of each of the first tiles include respective sizes of input data of each of the first tiles and respective sizes of filter data of each of the first tiles and where the meta information of each of the second tiles include respective sizes of input data of each of the second tiles and respective sizes of filter data of each of the second tiles, a cost information of each of the plurality of processing cores indicating a received data quantity before execution of the second tiles; and
allocate, using the cost information of each of the plurality of processing cores, one or more of the second tiles to respective processing cores of the plurality of processing cores according to respective minimum values of the cost information of each of the plurality of processing cores,
wherein the plurality of processing cores further generate output by executing the allocated one or more of the second tiles, and
wherein each respective tile of the first and second tiles corresponds to a multi-operation process of a plurality of processes of a plurality of neural network models.

15. The computing device of claim 14, wherein, for the determining of the cost information of each of the plurality of processing cores, the tile scheduler is configured to:
determine, for each of the plurality of processing cores, a received data quantity for each pairing between each of the first tiles and each of the second tiles based on the meta information of each of the first tiles and the meta information of each of the second tiles; and
determine the cost information of each of the plurality of processing cores based on respective results of the determining of the received data quantity for each pairing.

16. The computing device of claim 15, wherein the determining of the received data quantity for each pairing includes:
determining a first received data quantity of a first processing core of the plurality of processing cores for a first pairing among the pairings, where a first tile of the first pairing is allocated to the first processing core, by determining a size of filter data of a second tile of the first pairing, and
differently determining a second received data quantity of the first processing core for a second pairing among the pairings, where a first tile of the second pairing is allocated to another processing core of the plurality of processing cores, by determining a sum of a size of filter data of a second tile of the second pairing and a size of output data of the first tile of the second pairing.

17. The computing device of claim 15, wherein the determining of the cost information of each of the plurality of processing cores includes determining a cost matrix of each of the plurality of processing cores.

18. The computing device of claim 14, wherein each of the first tiles corresponds to a multi-operation process of a neural network model of the plurality of neural network models, and each of the second tiles corresponds to a multi-operation process of another neural network model of the plurality of neural network models.

19. The computing device of claim 18, wherein each of the second tiles corresponding to the multi-operation process of the other neural network model is allocated to the plurality of processing cores, as a portion of the plurality of processing cores.

20. The computing device of claim 14, wherein one of the first tiles is dependent on output data of another one of the first tiles.

21. The computing device of claim 14, wherein each of the plurality of processing cores includes a corresponding tile queue, and is configured to:
respectively enqueue to the corresponding tile queue the one or more of the second tiles dependent on which of the plurality of processing cores the one or more of the second tiles are allocated to by the tile scheduler; and respectively prefetch, from an external memory, source data of the one or more of the second tiles respectively enqueued to the corresponding tile queue.

22. The computing device of claim 14, wherein each of the plurality of processing cores includes a corresponding tile queue, and is configured to:

request the tile scheduler to not allocate an additional tile for the corresponding tile queue when the corresponding tile queue is full.

23. The computing device of claim 22, wherein a corresponding processing core of the plurality of processing cores having the corresponding tile queue that is full is configured to complete execution of one or more tiles stored in the corresponding tile queue and, upon the corresponding tile queue no longer being full after the execution of the one or more tiles stored in the corresponding tile queue, request the tile scheduler to allocate a tile to the corresponding processing core.

24. The computing device of claim 14, wherein each of the plurality of processing cores includes a corresponding tile queue, and is configured to respectively switch to a sleep mode when the corresponding tile queue is empty.

25. The computing device of claim 14, wherein the cost information of each of the plurality of processing cores indicates an amount of data received from each of the first tiles and each of the second tiles.

26. A processor-implemented method, comprising:

determine, based on meta information of each of first tiles already allocated to the plurality of processing cores and of each of second tiles to be allocated to the plurality of processing cores, where the meta information of each of the first tiles include respective sizes of input data of each of the first tiles and respective sizes of filter data of each of the first tiles and where the meta information of each of the second tiles include respective sizes of input data of each of the second tiles and respective sizes of filter data of each of the second tiles, a cost matrix of each of the plurality of processing cores indicating a received data quantity before execution of the second tiles;

allocating, using the cost matrix of each of the plurality of processing cores, the second tiles to respective processing cores of the plurality of processing cores according to respective minimum values of the cost matrix of each of the plurality of processing cores; and generating output by executing the allocated second tiles, wherein each respective tile of the first and second tiles corresponds to a multi-operation process of a plurality of processes of a plurality of neural network models.

27. The method of claim 26, wherein the plurality of processing cores are processing cores of a neural processor configured in communication with a memory controller configured to perform the allocating of the second tiles.

28. The method of claim 26, wherein the determining of the cost matrix of each of the plurality of processing cores comprises:

determining, for each of the plurality of processing cores, a received data quantity for each pairing between each of the first tiles and each of the second tiles based on the meta information of each of the first tiles and the meta information of each of the second tiles; and determining the cost matrix of each of the plurality of processing cores based on respective results of the determining of the received data quantity for each pairing.

29. The method of claim 28, wherein the determining of the received data quantity for each pairing includes:

determining a first received data quantity of a first processing core of the plurality of processing cores for a first pairing among the pairings, where a first tile of the first pairing is allocated to the first processing core, by determining a size of filter data of a second tile of the first pairing, and differently determining a second received data quantity of the first processing core for a second pairing among the pairings, where a first tile of the second pairing is allocated to another processing core of the plurality of processing cores, by determining a sum of a size of filter data of a second tile of the second pairing and a size of output data of the first tile of the second pairing.

30. The method of claim 26, wherein the cost matrix of each of the plurality of processing cores indicates an amount of data received from each of the first tiles and each of the second tiles.

* * * * *